United States Patent
Rasband et al.

(10) Patent No.: US 9,742,810 B2
(45) Date of Patent: *Aug. 22, 2017

(54) NETWORK NODE SECURITY USING SHORT RANGE COMMUNICATION

(71) Applicants: Paul B. Rasband, Lantana, FL (US); Mohammad Mohiuddin, Boynton Beach, FL (US); Stewart E. Hall, Wellington, FL (US)

(72) Inventors: Paul B. Rasband, Lantana, FL (US); Mohammad Mohiuddin, Boynton Beach, FL (US); Stewart E. Hall, Wellington, FL (US)

(73) Assignee: Tyco Fire & Security GmbH, Neuhausen AM Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,728

(22) Filed: Oct. 10, 2016

(65) Prior Publication Data

US 2017/0034218 A1    Feb. 2, 2017

Related U.S. Application Data (63) Continuation of application No. 14/229,318, filed on Mar. 28, 2014, now Pat. No. 9,477,841.

(51) Int. Cl.
*G06F 21/60* (2013.01)
*H04L 29/06* (2006.01)
(Continued)

(52) U.S. Cl.
CPC ............ *H04L 63/20* (2013.01); *G06F 21/606* (2013.01); *H04L 63/0492* (2013.01);
(Continued)

(58) Field of Classification Search
CPC ... H04L 63/20; H04L 63/0492; H04L 63/205; G06F 21/606; H04W 4/008;
(Continued)

(56) References Cited

U.S. PATENT DOCUMENTS 7,984,291 B2  7/2011  Eronen et al.
8,381,270 B1  2/2013  Hsieh et al.
(Continued)

FOREIGN PATENT DOCUMENTS

EP       2096505 A1    9/2009

*Primary Examiner* — Kambiz Zand
*Assistant Examiner* — Benjamin Kaplan
(74) *Attorney, Agent, or Firm* — Fox Rothschild LLP; Robert J. Sacco; Carol E. Thorstad-Forsyth (57) ABSTRACT

Systems (100) and methods for network node security configuration. The methods involve: performing operations by a mobile communication device (104) to obtain a unique identifier from a network node (108) to be installed at a customer facility (102) via a first short range communication link (110); communicating a signal comprising the unique identifier from the mobile communication device to a remote server (118) via a first long range communication link (112); verifying by the remote server that a correct type of network node is being installed at a first location within the customer facility according to a respective work order; and communicating security information, useful for configuring security functions of the network node, from the remote server to the network node via the mobile communication device, without presenting the security information to a user of the mobile communication device or storing the security information in the mobile communication device.

14 Claims, 5 Drawing Sheets

(51) Int. Cl.
| | |
|---|---|
| *H04W 4/00* | (2009.01) |
| *H04W 12/04* | (2009.01) |
| *H04W 12/02* | (2009.01) |
| *H04W 84/18* | (2009.01) |
| *H04W 88/06* | (2009.01) |

(52) U.S. Cl.
CPC ........... *H04W 4/001* (2013.01); *H04W 4/006* (2013.01); *H04W 4/008* (2013.01); *H04W 12/04* (2013.01); *H04L 63/205* (2013.01); *H04W 12/02* (2013.01); *H04W 84/18* (2013.01); *H04W 88/06* (2013.01)

(58) Field of Classification Search
CPC ..... H04W 4/001; H04W 4/006; H04W 12/04; H04W 84/18; H04W 88/06; H04W 12/02
USPC .......................................................... 726/1
See application file for complete search history.

(56) References Cited

U.S. PATENT DOCUMENTS

| | | | |
|---|---|---|---|
| 8,606,875 | B1 | 12/2013 | Chouanard et al. |
| 2001/0015919 | A1* | 8/2001 | Kean .................. G06F 12/1408 365/200 |
| 2001/0037458 | A1* | 11/2001 | Kean .................. G06F 12/1408 713/193 |
| 2003/0200285 | A1 | 10/2003 | Hansen et al. |
| 2005/0204134 | A1 | 9/2005 | Von Arx et al. |
| 2007/0288765 | A1* | 12/2007 | Kean ...................... G06F 21/76 713/193 |
| 2014/0244329 | A1 | 8/2014 | Urban |

\* cited by examiner

NETWORK NODE SECURITY USING SHORT RANGE COMMUNICATION

CROSS REFERENCE TO RELATED APPLICATIONS

This application is a continuation application of, and claims priority to, U.S. patent application Ser. No. 14/229,318, filed Mar. 28, 2014. The contents of the above listed document is herein incorporated by reference.

FIELD OF THE INVENTION

This document relates generally to systems and methods for providing network security. More particularly, this document relates to systems and methods for providing network node security using short range communication.

BACKGROUND OF THE INVENTION

Managing security certificates and the distribution thereof among Wireless Sensor Network ("WSN") nodes is a challenging task for an enterprise which may be, on a monthly basis, installing millions of WSN nodes among thousands of customer sites. Each WSN node must be provided a security certificate that allows it to function on its secure network, but disallows general eavesdropping by non-network nodes. As known in the art, the security certificate facilitates secure communications over a network between the WSN nodes and/or other network nodes. In this regard, the security certificate is an electronic document that uses a digital signature to bind a public key with an identity—information such as the name of a person or a business organization, an address, and so forth. The security certificate can be used to verify that a public key belongs to the person or business organization.

For a large corporation, it is imperative that generic security certificates not be used since they would logically be widely distributed and present serious security threats to a new network. Also, programming of security certificates in the field using wireless transmission to a WSN node immediately after first power-up is dangerous because of potential eavesdropping.

Therefore, the safest place to program security certificates into WSN nodes is at the factory. In this case, exact pre-staging of all WSN nodes for a given installation is required many weeks or even months prior to their actual installation. The pre-staging would require determining: which WSN nodes are to be disposed in a particular building; at what location within the building each WSN node is to be deployed; and programming each WSN node specific for the respective intended location in the building. This staging is very inconvenient and impractical in scenarios in which a relatively large number of WSN nodes (e.g., 10,000 WSN nodes) are to be installed for at least one enterprise at locations within a plurality of buildings (e.g., 500 buildings). It may even be impossible if the installer is a third party who maintains a running inventory of WSN hardware.

Existing practice relies on short-time use of default security certificates, Universal Serial Bus ("USB") dongles, on-site pin programming, and other similar methods. In these cases, the WSN system may be exposed to real security threats. Additionally or alternatively, the installation of the WSN nodes is physically inconvenient and/or requires a relatively long amount of time to complete.

SUMMARY OF THE INVENTION

The present invention concerns implementing systems and methods for network node security configuration. The methods comprise: performing operations by a mobile communication device to obtain a unique identifier from a network node to be installed at a customer facility via a first short range communication link; and communicating a signal comprising the unique identifier from the mobile communication device to a remote server via a first long range communication link. In some scenarios, the signal further comprises information specifying at least one of a location within the customer facility at which the network node is to be installed, a particular work order selected by a user of the mobile communication device, and a node type for the network node.

Next, the remote server verifies that a correct type of network node is being installed at a first location within the customer facility according to a respective work order. Upon such verification, the remote server: identifies what security information is to be sent to the network node based at least in part on information obtained by the mobile communication device from the network node via a short range communication link; and retrieve the identified security information from a datastore located in a provider facility remotely located from the customer facility. The retrieved security information is useful for configuring security functions of the network node. As such, the retrieved security information is sent from the remote server to the network node via the mobile communication device. Notably, the security information is communicated to the network node without presenting the security information to a user of the mobile communication device or storing the security information in the mobile communication device. Also, the security information may be communicated from the remote server in an encrypted form.

Thereafter, the security information is stored in a short range communication device of the network node. After the network node is turned on, the security information is transferred from the short range communication device to a processor of the network node. The security functions of the network node are then configured in accordance with the security information which was transferred to the processor. An indicator may be output from the network node indicating successful security enablement thereof. Also, the network node may perform operations to join a network using the security functions configured in accordance with the security information.

DESCRIPTION OF THE DRAWINGS

Embodiments will be described with reference to the following drawing figures, in which like numerals represent like items throughout the figures, and in which.

DETAILED DESCRIPTION OF THE INVENTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Embodiments of the present invention will now be described with respect to FIGS. 1-4. These embodiments generally relate to novel systems and methods for network node security configuration by an installer. In this regard, the present invention relies on Short Range Communication ("SRC") between a Mobile Communication Device ("MCD") possessed by the installer and a network node being installed by the installer at a customer facility. The MCD and network node are both equipped with a first communications module. The first communications module comprises an SRC module (e.g., an antenna and SRC driver chip) for enabling SRC communications therebetween. Because of the nature of the SRC coupling, it is nearly impossible for another device to intercept the communications unless this device has an antenna in the immediate vicinity (e.g., within 0.5 to 5.0 feet) of the MCD and network node, even if this device has a large antenna and complex receive sensitivity boosting circuitry. Specific examples of technology that might be used in the SRC module include High Frequency Radio Frequency Identifier ("HF RFID") technology (such as inductively coupled 13.56 MHz RFID), Near Field Communication ("NFC") technology, capacitively coupled RFID, or Ultra High Frequency ("UHF") RFID with intentional antenna mismatching operating at very low transmit power (so called "near field UHF"). The SRC module may use other alternatively technologies, however.

The MCD is also equipped with a second communications module. The second communications module may include, but is not limited to, a cellular communications module for providing a back-channel link to an enterprise network. The enterprise network comprises one or more servers and databases accessible via a public network (e.g., the Internet). The SRC and cellular communications facilitate the loading of security information on the network node. The security information may include, but is not limited to, security certificates, random number generator seed values, nonce fields or sub-fields and other security oriented configuration data. This process of loading security information onto the network node will be described in detail below. The security certificates can include, but are not limited to, any security certificate that can be used in symmetric or asymmetric encryption.

At this time, it should also be appreciated that unlike conventional systems the installer of the network node (who may not be trustworthy) is not part of the security loop for providing the security information to the network node. In this regard, the installer does not have any passwords which give his/her special authorization to provide the security information to the network node. Instead, the installer has the MCD with the SRC functionality for communicating the security information from an enterprise server to the network node. However, the installer does not have access to the logic implementing the present invention and/or information describing the particulars thereof. Also, the security information is never presented to the installer and/or stored on the mobile device. As such, the risk associated with having an untrustworthy installer involved in the process of the network node security configuration is minimized. The SRC functionality may be implemented such that it is physically contained inside the housing of the MCD, or it may be implemented using a dongle on one of the MCD's communications ports.

Figure 1:
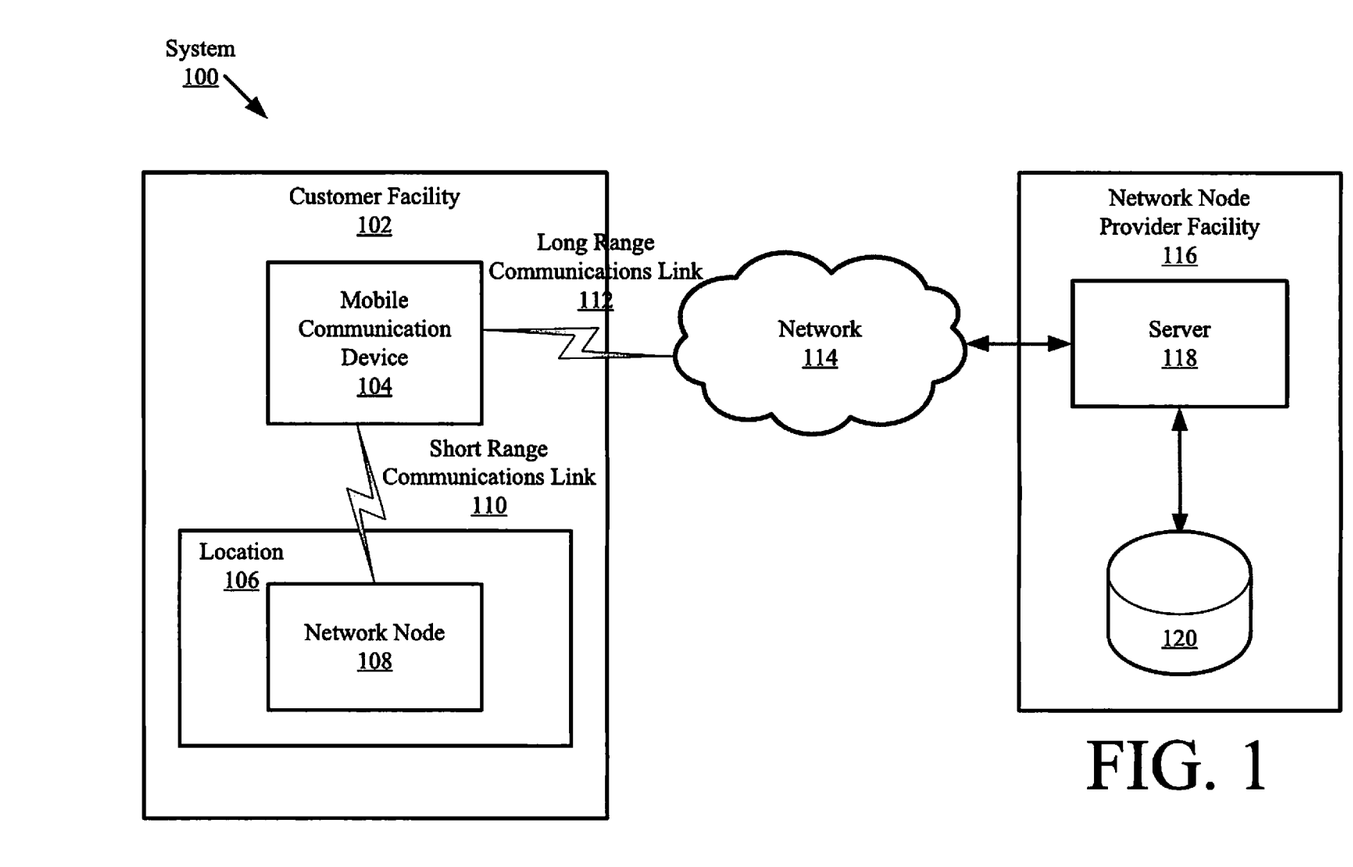
FIG. 1 is a schematic illustration of an exemplary system that is useful for understanding the present invention.

Referring now to FIG. 1, there is provided a schematic illustration of an exemplary system 100 that is useful for understanding the present invention. System 100 is generally configured to enable the installation of network nodes 108 at customer facilities 102. Such installation is achieved using an MCD 104, a network 114 (e.g., the Internet or other public network) at least one server 118 and at least one database 120. Assumption is that network 114 and a Network Node Provider ("NNP") facility 116 are operational at the time of installation. However, this may not be the case in all scenarios. As such, the present invention is not limited to situations where the network 114 and NNP facility 116 are operational at the time of installation.

The server 118 and database 120 are located at the NNP facility 116 which is remote from the customer facility 102. Security information is stored on the database 120 which is useful for configuring the network node 108 for secure communications with other network nodes in a local wireless sensor network. The security information can include, but is not limited to, installation specific sets of security certificates, network specific sets of security certificates, random number generator seed values, cartographic keys, cryptographic algorithms, nonce fields or sub-fields and/or other security oriented configuration data. Each security certificate comprises an electronic document that uses a digital signature to bind a public key with an identity—information such as the name of a person or a business organization, an address, and so forth. The security certificate can be used to verify that a public key belongs to the person or business organization. Alternatively, the security information may comprise the security key itself, such as an AES-128 key used by the network node directly to encrypt and decrypt messages sent and received on the wireless network.

The MCD 104 has a Work Order Software Application ("WOSA") installed therein. The WOSA is operative to facilitate the management of a work order to be handled by a user of the MCD 104. The work order specifies the date and time at which at least one network node 108 is to be installed at a customer facility 102. In accordance with the particulars of the work order, the user of the MCD 104 performs activities to install the network node 108 at a location 106 within the customer facility 102. Such activities involve configuring the network node 108 with requisite security information stored in the database 120. An exemplary process for achieving the security configuration of the network node 108 will now be described in relation to FIGS. 2A-2B.

Figure 2A:
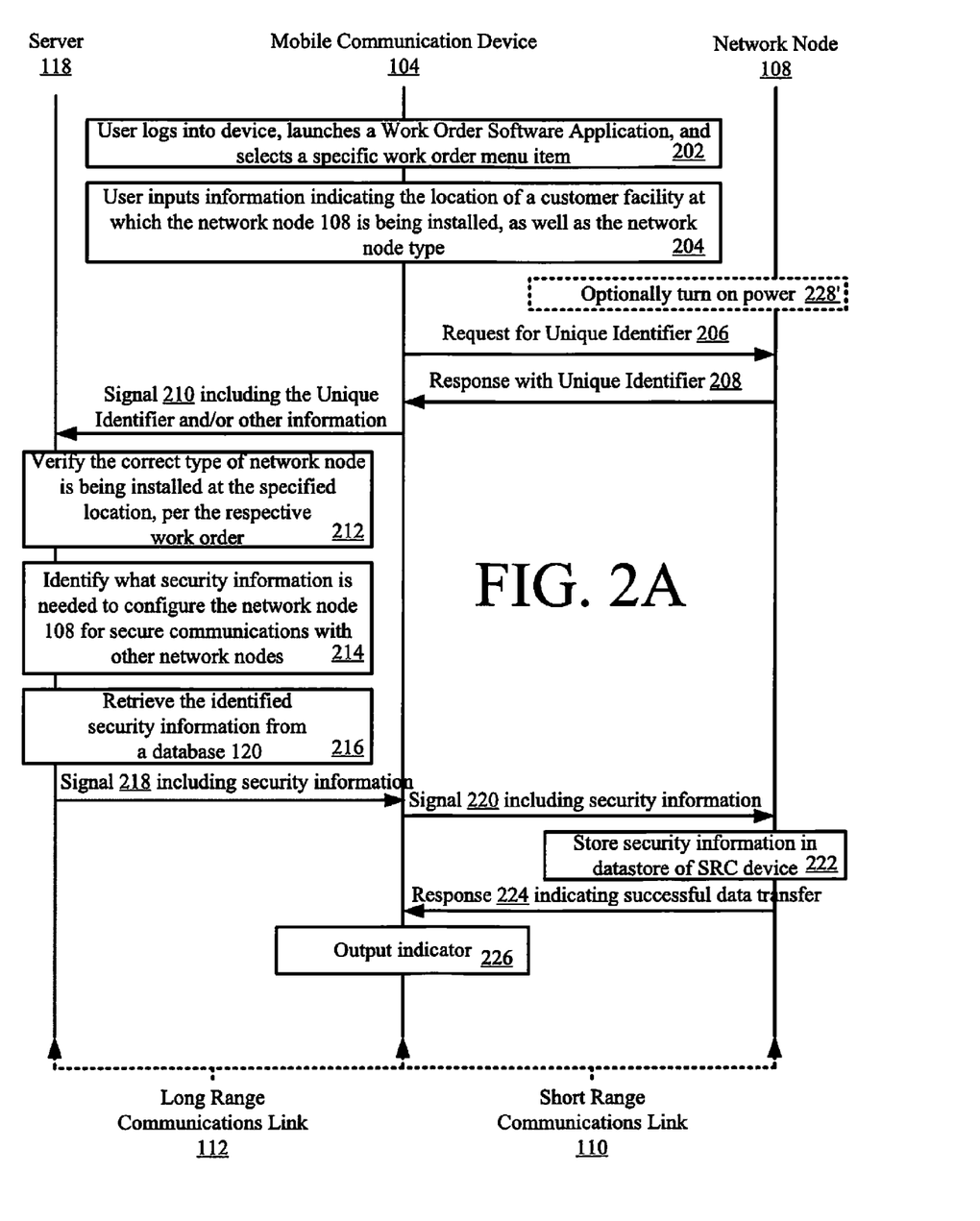
FIGS. 2A-2B collectively provide a schematic illustration that is useful for understanding an exemplary process for network node security configuration.

As shown by functional block 202 of FIG. 2A, the user of the MCD 104 logs into the device and launches the WOSA. In turn, the WOSA displays a Graphical User Interface ("GUI") to the user which includes at least one widget for selecting a work order of a plurality of work orders. For example, a drop down menu is presented to the user of the MCD 104 that comprises selectable identifiers for each of the work orders. Accordingly, the user performs a first user-software interaction for selecting a particular work order from the plurality of work orders. Thereafter, the user performs a second user-software interaction for inputting information indicating the location 106 of the customer facility 102 at which the network node 108 is being installed, as shown by functional block 204. In some scenarios, a map of the customer facility 102 is presented to the user such that the user can select a location identified in the map. The user may further perform a third user-software interaction for inputting a network node type into the WOSA.

Subsequently, the WOSA performs operations to generate and send a request for a unique identifier 206 to the network node 108. Notably, this request 206 is sent from the MCD 104 to the network node 108 via an SRC communications link 110. The SRC communications link 110 can be implemented using any known or to be known SRC technology. For example, the SRC technology includes, but is not limited to, Near Field Communication ("NFC") technology, InfRared ("IR") technology, Wireless Fidelity ("Wi-Fi") technology, Radio Frequency Identification ("RFID") technology, Bluetooth technology, ZigBee technology, and/or optical read/write technology (e.g., photocell and light emitting diode based technology). Each of the listed types of SRC technology is well known in the art, and therefore will not be described herein. In all SRC scenarios, the network node 108 comprises a passive SRC device or an active SRC device. Passive and active SRC devices are well known in the art, and therefore will not be described in detail herein. If a passive SRC device is employed, then the network node 108 can receive and respond to the request 206 without being powered on. The response 208 includes the requested unique identifier which uniquely identifies the network node 108. In some scenarios, the unique identifier includes, but is not limited to, a Media Access Control ("MAC") address or an Institute of Electrical and Electronics Engineers ("IEEE") 64-bit universal identifier.

In response to the reception of the unique identifier, the MCD 104 communicates a signal 210 to the server 118 located at the NNP facility 116. The signal 210 is communicated via a long range communications link 112 (e.g., Radio Frequency ("RF") communications link) and the network 114. The signal 210 can include, but is not limited to, information specifying a work order number, an installer identifier, the location within a customer facility at which the network node is being installed, a current time, the node type of the network node 108, and/or the unique identifier for the network node 108.

Upon receipt of signal 210, the server 118 processes the received information to verify that the correct type of network node is being installed at the specified location 106, per the respective work order. The verification can be achieved simply by comparing the received information to corresponding information stored in the database 120 to determine if a match exists therebetween. The supplying of the node type by the installer is optional, and in some scenarios this can be inferred by the network node's unique identifier using a table look-up in server 118 which matches the node type to the unique identifier. Such inference relieves the installer of one potentially time-consuming responsibility and represents an advantage of the present invention.

If a match between the supplied and/or inferred installer information and the specified work order information is not found to exist, then the server 118 concludes that the incorrect type of network node is being installed at the specified location 106. In this case, the server 118 may send a message to the user of the MCD indicating such a conclusion so that the appropriate measures can be taken thereby (e.g., obtain a new network node and start the process over).

In contrast, if a match is found to exist, then the server 118 concludes that the correct type of network node is indeed being installed at the specified location 106. When such a conclusion is made, the server 118 identifies what security information is needed to configure the network node 108 for secure communications with other network nodes, as shown by functional block 214. This identification can be made based on the contents of the work order, the install location specified in signal 210, the type of network node specified in signal 210, and/or other relevant information. In some cases, this identification is made by a security administration software application running entirely or partially on the server 118 or other network node communicatively coupled to server 118.

Subsequently, the server 118 retrieves the identified security information from the database 120, as shown by functional block 216. As noted above, this security information can include, but is not limited to, installation specific sets of security certificates, network specific sets of security certificates, random number generator seed values, cartographic keys, cryptographic algorithms, and/or other security oriented configuration data.

Thereafter, the retrieved security information is sent from the server 118 to the MCD 104 via signal 218 and the long rage communications link 112. Notably, the security information is sent in an encrypted form. Also, the security information is not accessible to the user of the MCD 104. As such, the security information is never presented to the user of the MCD 104 in any format, nor saved in any persistent memory of the MCD or its SRC dongle if such is used, thereby at least partially ensuring secure communication of the security information from the server 118 to the network node 108.

In turn, the MCD 104 sends a signal 220 including the security information to the network node 108 via the SRC communications link 110. The security information is sent in an encrypted form. At the network node 108, the security information is stored in a data store of an SRC device thereof in its encrypted form, as shown by functional block 222. Depending on the exact nature of the SRC link technology and the SRC module being used, the network node itself may or may not be powered at this point. If the network node is not powered, the SRC module uses passive (e.g., back-scatter) techniques to response to incoming queries or requests from the MCD via the SRC link. If the network node is powered, messages may be actively sent or transmitted in the traditional sense (e.g., using modulation of generated fields) from the network node to the MCD. Either way, at this point, a response 224 is made by the network node 108 to the MCD 104 indicating that the data transfer was successful. Upon receipt of the response 224, the MCD 104 performs operations to output an indicator to the user thereof indicating the successful data transfer, as shown by functional block 226. The indication can be an audio indication, a visual indication and/or a tactile indication.

Figure 2B:
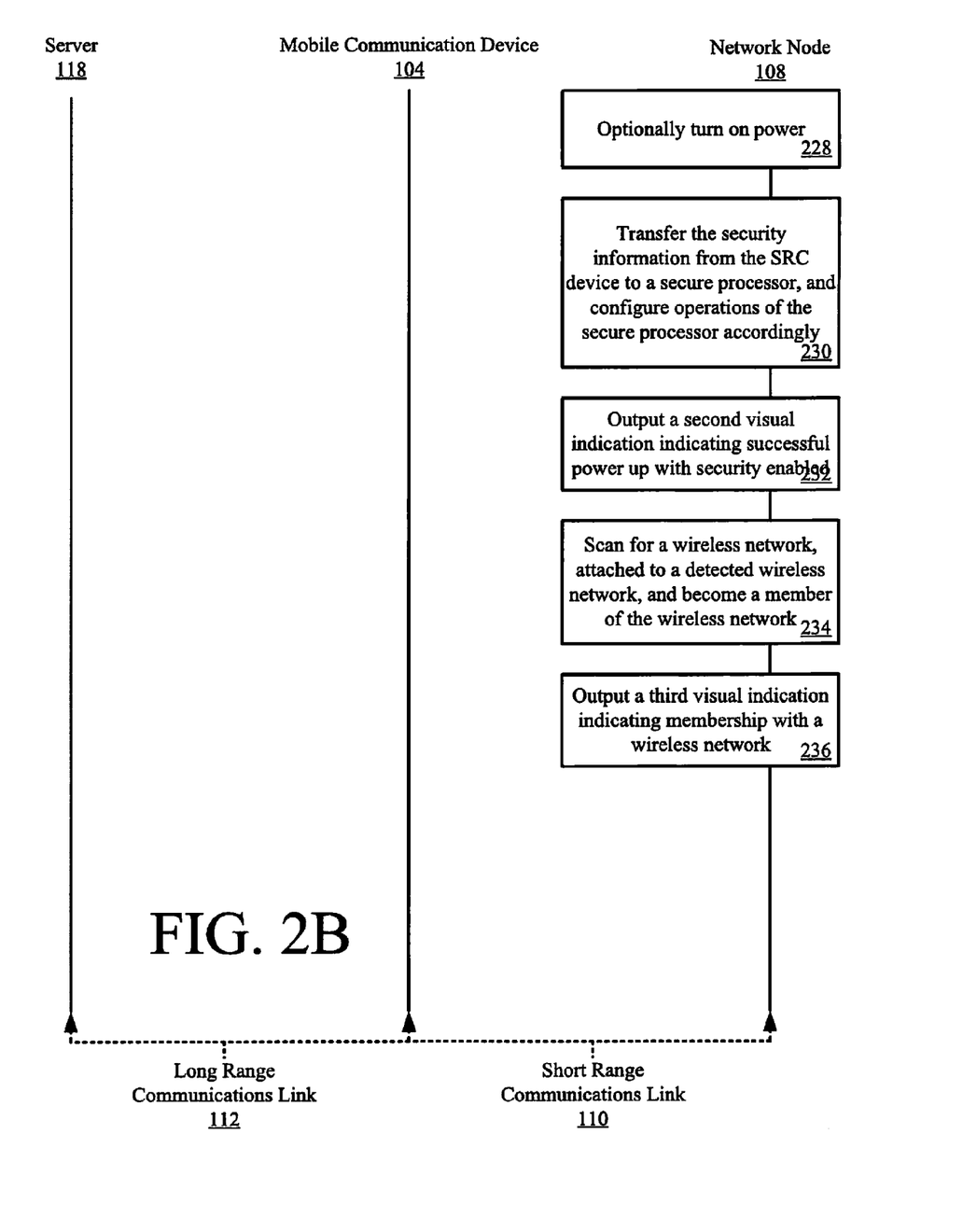

When the indicator is output to the user of the MCD 104, the user can then turn on power to the network node 108, as shown by functional block 228 of FIG. 2B. In some scenarios (e.g., with active rather than passive SRC links as described above), power to the network node 108 is alternatively turned on before the request 206 is sent from the MCD 104 to the network node, as shown by functional block 228' of FIG. 2A.

After the power has been turned on, the network node 108 performs various operations in functional block 230 to: transfer the security information from the SRC device to a secure processor thereof; and configure operations of the secure processor accordingly. In some scenarios, the secure processor is in a tamper proof enclosure. Also, the security information is transferred in an encrypted form. Accordingly, the security information is decrypted prior to configuration of the secure processor. Once the secure processor has been configured to operate in a secure manner according to the security information, a second indicator can be output from the network node 108 indicating successful power up with security enabled (i.e., that the device booted up in the right mode and successfully installed the security information), as shown by functional block 232. The second indicator can include, but is not limited to, an auditory indicator, a visual indicator (such as a light emitting diode) and/or a tactile indicator (e.g., such as vibration).

Thereafter as shown by functional block 234, the network node 108 performs various registration operations in a secure manner using the security information. The registration operations may include, but are not limited to, scanning for a wireless network, attaching to a detected wireless network, and becoming a member of the detected wireless network. Upon becoming a member of the wireless network, a third visual indicator can be output from the network node 108 indicating membership thereof with a wireless network. The third indicator can include, but is not limited to, an auditory indicator, a visual indicator and/or a tactile indicator.

In some scenarios, the above described process is repeated (except for the operations in functional block 202) for all network node installations required by the work order. Such an iterative or repetitive process, allows a network node provider to track how many network nodes have been installed by a particular installer, and where each network node has been installed. This ability facilitates the management of work orders.

The above described process allows secure, site specific, late stage transfer of security information from a server based security administrator application to the network node. The transfer is achieved without the human installer ever knowing or seeing the security information and/or transmission of the security information in a manner which can be easily intercepted by eavesdropping devices. It should be noted that the security application running on the MCD 104 may perform the above described process without keeping any kind of record of the actual security configuration data. That data simply passes through the MCD 104 application without being locally stored. This makes it impossible for the network security to be breached due to MCD theft or dishonesty on the part of the installer.

Figure 3:
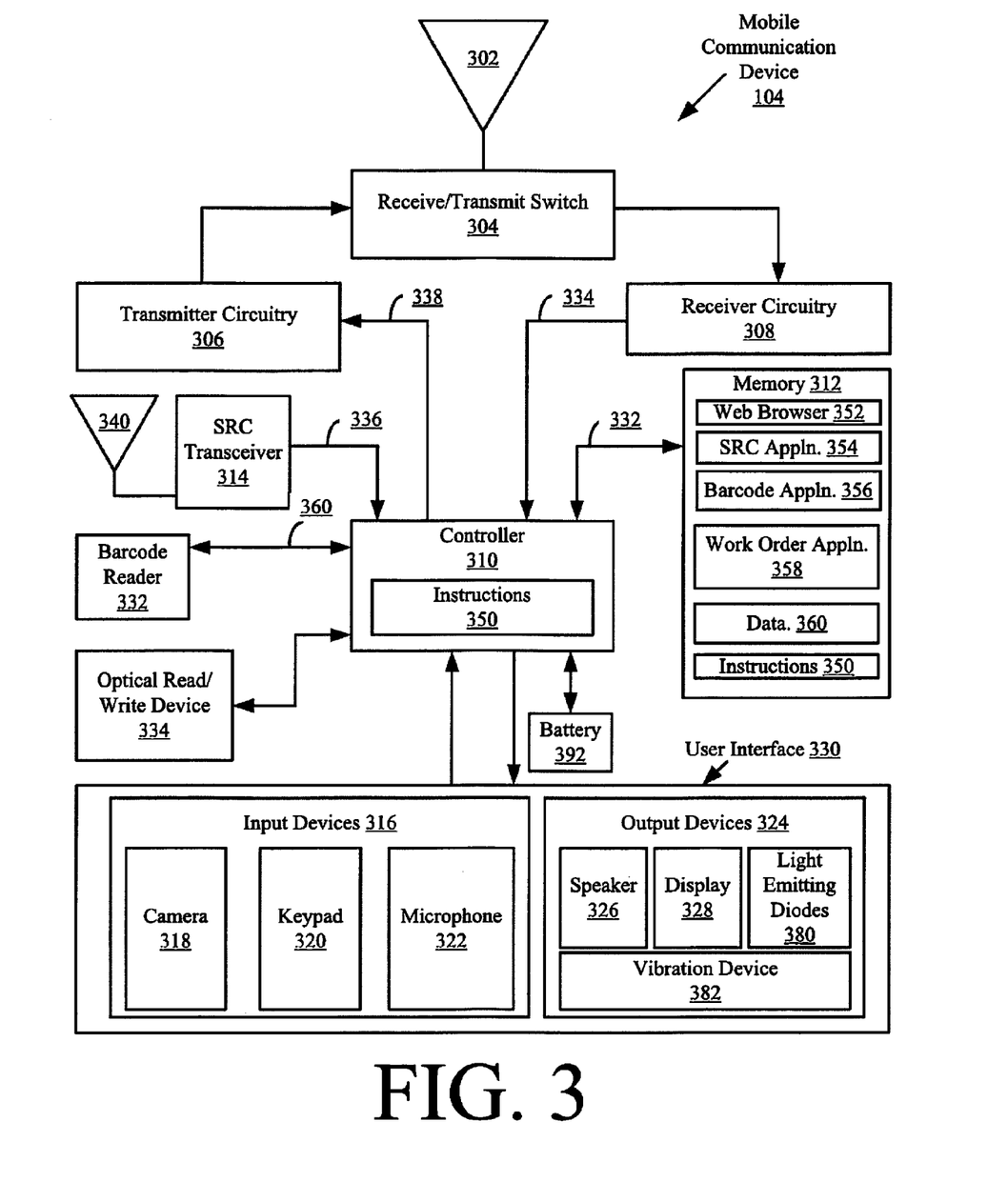
FIG. 3 is a schematic illustration of an exemplary architecture for the mobile communication device shown in FIG. 1.

Referring now to FIG. 3, there is provided a schematic illustration of an exemplary architecture for the MCD 104 that is useful for understanding the present invention. MCD 104 may include more or less components than those shown in FIG. 3. However, the components shown are sufficient to disclose an illustrative embodiment implementing the present invention. Some or all of the components of the MCD 104 can be implemented in hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

The MCD 104 can include, but is not limited to, a notebook computer, a personal digital assistant, a cellular phone or a mobile phone with smart device functionality (e.g., a Smartphone). In this regard, the MCD 104 comprises an antenna 302 for receiving and transmitting Radio Frequency ("RF") signals. A receive/transmit ("Rx/Tx") switch 304 selectively couples the antenna 302 to the transmitter circuitry 306 and the receiver circuitry 308 in a manner familiar to those skilled in the art. The receiver circuitry 308 demodulates and decodes the RF signals received from an external device. The receiver circuitry 308 is coupled to a controller (or microprocessor) 310 via an electrical connection 334. The receiver circuitry 308 provides the decoded signal information to the controller 310. The controller 310 uses the decoded RF signal information in accordance with the function(s) of the MCD 104. The controller 310 also provides information to the transmitter circuitry 306 for encoding and modulating information into RF signals. Accordingly, the controller 210 is coupled to the transmitter circuitry 306 via an electrical connection 338. The transmitter circuitry 306 communicates the RF signals to the antenna 302 for transmission to an external device via the Rx/Tx switch 304.

MCD 104 also comprises an antenna 340 coupled to an SRC transceiver 314 for receiving SRC signals. SRC transceivers are well known in the art, and therefore will not be described in detail herein. However, it should be understood that the SRC transceiver 314 processes the SRC signals to extract information therefrom. The SRC transceiver 314 may process the SRC signals in a manner defined by the SRC application 354 installed on the MCD 104. The SRC application 354 can include, but is not limited to, a Commercial Off the Shelf ("COTS") application. The SRC transceiver 314 is coupled to the controller 310 via an electrical connection 336. The controller uses the extracted information in accordance with the function(s) of the MCD 104. For example, the extracted information can be used by the MCD 104 to provide unique identifiers of network nodes to a sever of the network node provider. The unique identifier can then be used by the server to identify specific security information which is to be communicated to the network node via the MCD 104. In some cases, this information can be received by the MCD 104 via an optical read/write device 334. Although the optical read/write device 334 is shown as separate and apart from the SRC components 340, 314, the present invention is not limited in this regard. The optical read/write device 334 can alternatively or additionally comprise the SRC components of the MCD 104. Optical read/write devices are well known in the art, and therefore will not be described herein. Any known or to be known optical read/write device can be used herein without limitation. Still, it should be understood that in some scenarios, the optical read/write device may comprises photocells and light emitting diodes.

The controller 310 may store received and extracted information in memory 312 of the MCD 104. Accordingly, the memory 312 is connected to and accessible by the controller 310 through electrical connection 332. The memory 312 may be a volatile memory and/or a non-volatile memory. For example, memory 312 can include, but is not limited to, a Random Access Memory ("RAM"), a Dynamic RAM ("DRAM"), a Read Only Memory ("ROM") and a flash memory. The memory 312 may also comprise unsecure memory and/or secure memory. The memory 312 can be used to store various other types of data 360 therein, such as authentication information, cryptographic information, location information, and various work order related information.

The MCD 104 also may comprise a barcode reader 332. Barcode readers are well known in the art, and therefore will not be described herein. However, it should be understood that the barcode reader 332 is generally configured to scan a barcode and process the scanned barcode to extract information therefrom. The barcode reader 332 may process the barcode in a manner defined by the barcode application 356 installed on the MCD 104. Additionally, the barcode scanning application can use camera 318 to capture the barcode image for processing. The barcode application 356 can include, but is not limited to, a COTS application. The barcode reader 332 provides the extracted information to the controller 310. As such, the barcode reader 332 is coupled to the controller 310 via an electrical connection 360. The controller 310 uses the extracted information in accordance with the function(s) of the MCD 104. For example, the extracted information can be used by MCD 104 to obtain security information which is to be provided to a network node.

As shown in FIG. 3, one or more sets of instructions 350 are stored in memory 312. The instructions may include customizable instructions and non-customizable instructions. The instructions 350 can also reside, completely or at least partially, within the controller 310 during execution thereof by MCD 104. In this regard, the memory 312 and the controller 310 can constitute machine-readable media. The term "machine-readable media", as used herein, refers to a single medium or multiple media that stores one or more sets of instructions 350. The term "machine-readable media", as used here, also refers to any medium that is capable of storing, encoding or carrying the set of instructions 350 for execution by the MCD 104 and that causes the MCD 104 to perform one or more of the methodologies of the present disclosure.

The controller 310 is also connected to a user interface 330. The user interface 330 comprises input devices 316, output devices 324 and software routines (not shown in FIG. 3) configured to allow a user to interact with and control software applications (e.g., software applications 352-258 and other software applications) installed on MCD 104. Such input and output devices may include, but are not limited to, a display 328, a speaker 326, a keypad 320, a directional pad (not shown in FIG. 3), a directional knob (not shown in FIG. 3), a microphone 322, and a cameral 318. The display 328 may be designed to accept touch screen inputs. As such, user interface 330 can facilitate a user software interaction for launching applications (e.g., software applications 352-258 and other software applications) installed on MCD 104. The user interface 330 can facilitate a user-software interactive session for: initiating communications with an external device; writing data to and reading data from memory 312; initiating a work order application process for providing a network node with security information in accordance with the process described above in relation to FIG. 2.

The display 328, keypad 320, directional pad (not shown in FIG. 3) and directional knob (not shown in FIG. 3) can collectively provide a user with a means to initiate one or more software applications or functions of MCD 104. The application software 352-358 can facilitate the data exchange (a) a user and the MCD 104, (b) the MCD 104 and a network node via a SRC, and/or (c) the MCD 102 and a server of a network node provide via a non-SRC (e.g., via public network communications). In this regard, the application software 352-358 performs one or more of the following: verify the identity of a user of MCD 104 via an authentication process; present information to the user indicating this his/her identity has or has not been verified; present a Graphical User Interface ("GUI") to the user for enabling the user to initiate a work order process for obtaining and communicating security information to network nodes being installed at a customer facility in accordance with a particular work order.

Figure 4:
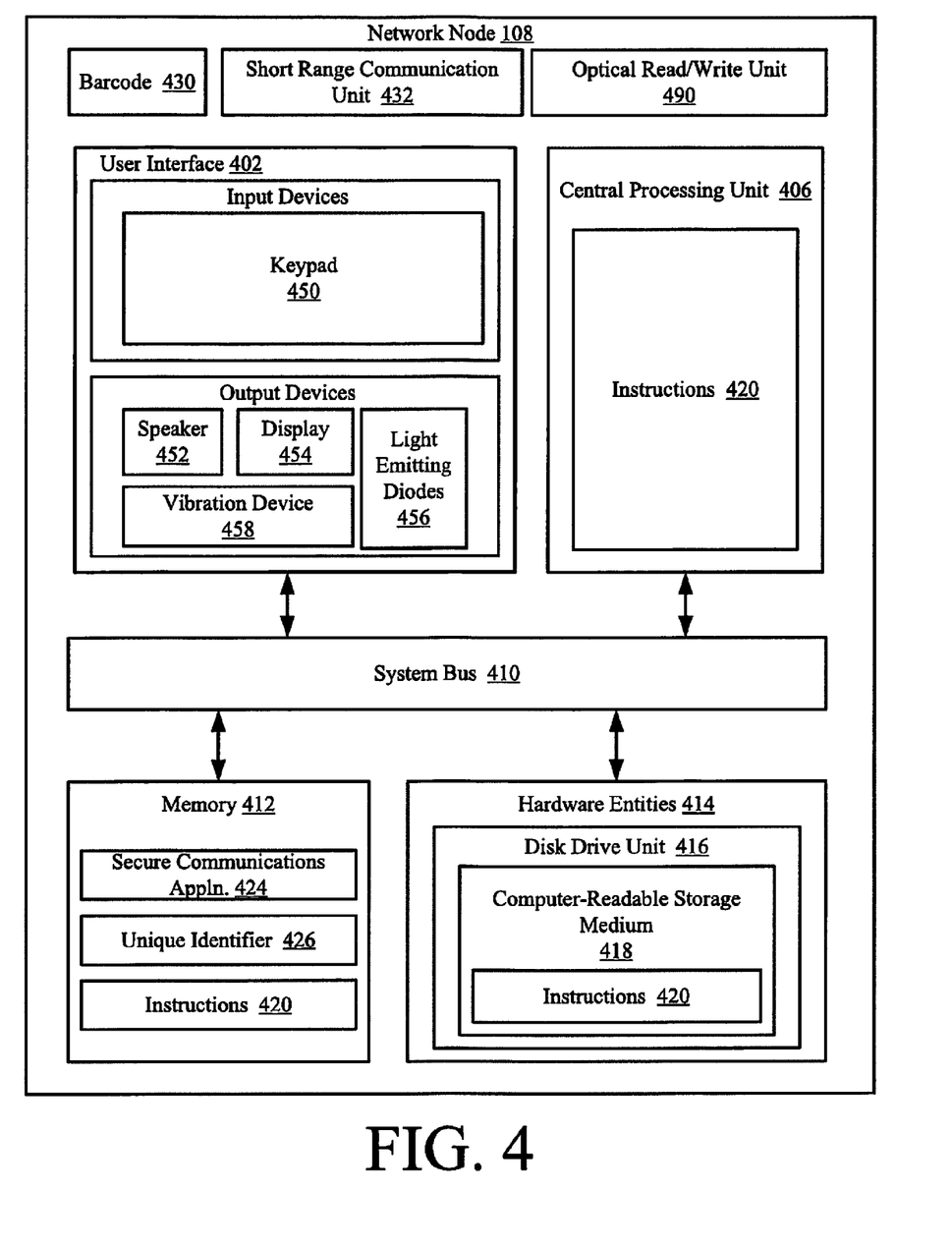
FIG. 4 is a schematic illustration of an exemplary architecture for the network node shown in FIG. 1.

Referring now to FIG. 4, there is provided a block diagram of an exemplary architecture for the network node 108 of FIG. 1. Notably, the network node 108 may include more or less components than those shown in FIG. 4. However, the components shown are sufficient to disclose an illustrative embodiment implementing the present invention. The hardware architecture of FIG. 4 represents one embodiment of a representative network node configured to facilitate the provision of secure, site specific, late stage transfer of security information from a server based security administrator application thereto. As such, the network node 108 of FIG. 4 implements at least a portion of a method for providing such secure, site specific, late stage transfer of security information from a server based security administrator application thereto in accordance with embodiments of the present invention. Some or all the components of the network node 108 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the network node 108 comprises a user interface 402, a Central Processing Unit ("CPU") 406, a system bus 410, a memory 412 connected to and accessible by other portions of network node 108 through system bus 410, and hardware entities 414 connected to system bus 410. The user interface can include input devices (e.g., a keypad 450) and output devices (e.g., speaker 452, a display 454, a vibration device 458 and/or light emitting diodes 456), which facilitate user-software interactions for controlling operations of the network node 108.

At least some of the hardware entities 414 perform actions involving access to and use of memory 412, which can be a Random Access Memory ("RAM"), a disk driver and/or a Compact Disc Read Only Memory ("CD-ROM"). The network node 108 also comprises a barcode reader/writer 430, an SRC unit 432 and an optical read/write unit. The SRC unit 432 may implement NFC technology, IR technology, Wi-Fi technology, RFID technology, Bluetooth technology, and/or ZigBee technology. Although the optical read/write unit 490 is shown as being separate and apart from the SRC unit 432, embodiments of the present invention are not limited in this regard. The optical read/write unit 490 may additionally or alternatively comprise at least a portion of the SRC unit 432. In some scenarios, the optical read/write unit 490 may include, but is not limited to, photocells and light emitting diodes.

Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the network node 108. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the network node 108 and that cause the network 108 to perform any one or more of the methodologies of the present disclosure.

In some embodiments of the present invention, the hardware entities 414 include an electronic circuit (e.g., a processor) programmed for facilitating the provision of secure communications over a network link. In this regard, it should be understood that the electronic circuit can access and run a software application 424 installed on the network node 108. The software application 424 is generally operative to facilitate secure communications with other network nodes of a given network to which the network node 108 is a member. In this regard, the software application 424 implements some or all of the work order process described above in relation to FIG. 2.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for network node security configuration, comprising:
    transmitting a unique identifier for and from a network node installed at a customer facility via a wireless short range communication link, the unique identifier uniquely identifying the network node;
    receiving at the network node via the wireless short range communication link a security configuration based on the unique identifier, without permitting access to the security configuration by a person installing the security configuration, wherein the security configuration is needed to configure security functions of the network node for secure communications with other network nodes at the customer facility, and serves as verification that the network node is correct for the installed location in the customer facility in accordance with a work order; and
    using the security configuration at the network node to facilitate the secure communications with other network nodes.

2. The method according to claim 1, wherein the security configuration information is received at the network node in an encrypted form.

3. The method according to claim 1, further comprising storing the security configuration information in a short range communication device of the network node.

4. The method according to claim 3, further comprising transferring the security configuration information from the short range communication device to a processor of the network node after the network node is turned on.

5. The method according to claim 4, further comprising configuring the security functions of the network node in accordance with the security configuration information which was transferred to the processor.

6. The method according to claim 5, further comprising outputting an indicator from the network node indicating successful security enablement thereof.

7. The method according to claim 6, further comprising performing operations by the network node to join a network using the security functions configured in accordance with the security configuration information.

8. A network node, comprising:
    a memory in which is stored a unique identifier which uniquely identifies the network security node;
    a wireless short range communication device configured to
        receive a request for the unique identifier,
        transmit the unique identifier in response to the request, and receive a security configuration based on the unique identifier, without permitting access to the security configuration by a person installing the security configuration, a processor configured to use the security configuration to configure security functions of the network node for secure communications with other network nodes; and wherein said security configuration received at the network node further comprises a verification that the network node is correct for the installed location in the customer facility in accordance with a work order.

9. The network node according to claim 8, wherein the security configuration information is encrypted.

10. The network node according to claim 9, wherein the short range communication device is configured to store the encrypted security configuration information.

11. The network node according to claim 10, further comprising a memory device, accessible to the processor, wherein said network node is configured to transfer the security configuration information to the memory device after the network node is turned on.

12. The network node according to claim 11, wherein the processor is configured to utilize the security configuration to configure security functions of the network node.

13. The network node according to claim 12, further comprising an indicator responsive to the processor which generates an output from the network node indicating successful security enablement thereof.

14. The network node according to claim 13, wherein the processor is configured to cause the network node to join a network using the security functions.

* * * * *